United States Patent [19]

Amick et al.

[11] 4,214,920

[45] Jul. 29, 1980

[54] METHOD FOR PRODUCING SOLAR CELL-GRADE SILICON FROM RICE HULLS

[75] Inventors: James A. Amick, Princeton, N.J.; John V. Milewski, Los Alamos, N. Mex.; Franklin J. Wright, Watchung, N.J.

[73] Assignee: Exxon Research & Engineering Co., Florham Park, N.J.

[21] Appl. No.: 23,300

[22] Filed: Mar. 23, 1979

[51] Int. Cl.² .................... H01L 21/04; C04B 31/00
[52] U.S. Cl. .................. 148/1.5; 106/288 B; 136/89 SG; 148/174; 252/188; 252/421; 252/427; 423/335; 423/345; 423/350
[58] Field of Search ............... 148/1.5, 174; 423/325, 423/335, 345, 350; 252/182, 188, 188.3 R, 421, 426, 427; 201/13, 14, 15, 16, 17; 106/69, 288 B, 288 Q, 309; 136/89 SG

[56] References Cited

U.S. PATENT DOCUMENTS

| | | | |
|---|---|---|---|
| 1,556,039 | 10/1925 | Shilstone | 252/421 X |
| 2,018,133 | 10/1935 | Kirchner | 423/345 |
| 2,115,973 | 5/1938 | Fleming | 252/427 X |
| 3,125,043 | 3/1964 | Gravel | 423/335 X |
| 3,451,944 | 6/1969 | Finch | 252/421 |
| 3,704,094 | 11/1972 | McClincy et al. | 423/350 |
| 3,754,076 | 8/1973 | Cutler | 423/345 |
| 3,887,359 | 6/1975 | Enger et al. | 423/350 X |
| 4,049,464 | 9/1977 | Tutsek et al. | 423/335 X |

OTHER PUBLICATIONS

Basu et al., "Manufacture of Silicon Tetrachloride from Rice Hulls", American Institute of Chemical Engineering Journal, vol. 19, No. 3, May 1973, pp. 439–445.

*Primary Examiner*—L. Dewayne Rutledge
*Assistant Examiner*—W. G. Saba
*Attorney, Agent, or Firm*—Paul E. Purwin

[57] ABSTRACT

The present invention relates to the production of high purity solar grade silicon from common rice hulls. A unique process for material purification and reduction includes leaching the rice hulls in acid followed by treatment with high purity water, coking the acid-cleaned hulls in a non-oxidizing ambient, compensating the carbon or silica content of the coked hulls to obtain a desired carbon to silica ratio and reducing the silica to produce high purity silicon.

31 Claims, 1 Drawing Figure

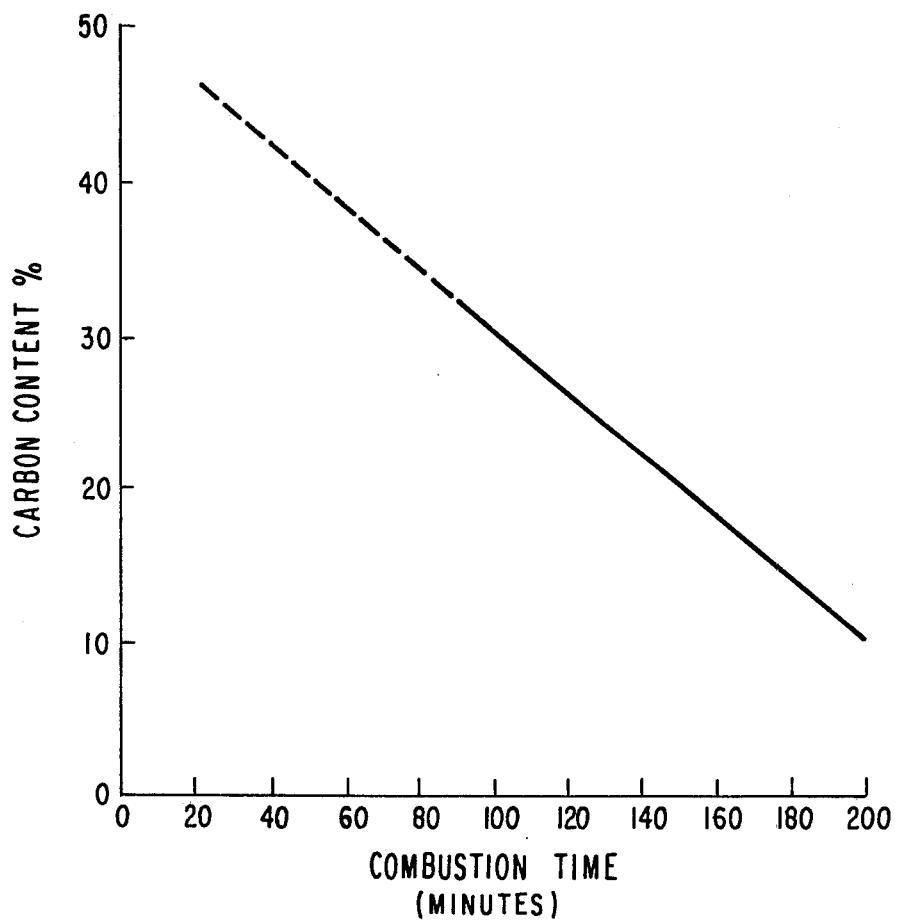

METHOD FOR PRODUCING SOLAR CELL-GRADE SILICON FROM RICE HULLS

BACKGROUND OF THE INVENTION

Since the introduction of the transistor in 1950, the solid state semiconductor industry has expanded immensely. The foundation of semiconductor technology is based upon silicon which constitutes the primary semiconductor of the industry.

In a similar fashion, solar cell production has evolved from outer space applications to a prospective alternate energy source to replace or supplement dwindling fossil fuel reserves. Once again, silicon is the predominant semiconductor material upon which the technology is based.

Fortunately, silicon, in the form of sand (or quartz) is one of the most abundant elements on earth and is readily available. Reduction of sand with carbon in a conventional arc furnace is a simple and inexpensive means of producing metallurgical grade silicon. Considering both material and processing costs, metallurgical grade silicon can be produced for as little as sixty cents per kilogram.

Unfortunately, even the purest sand and carbon sources produce metallurgical silicon having an impurity content in excess of an order of magnitude too large for semiconductor applications. Therefore, in the conventional processing procedure to produce silicon of a suitable purity for solar cell or transistor applications, expensive and complicated purification processes are employed to lower impurity levels. These processes typically involve the following steps: pulverizing the metallurgical grade silicon to finely divide the material; chlorination at high temperatures to produce trichlorosilane (and attendant impurity compounds such as metal chlorides); purifying the trichlorosilane by distillation and similar techniques to separate the trichlorosilane from the aforementioned contaminants; further purification (although accomplishable concurrent to the above step of distillation) of the trichlorosilane to remove metal compounds and other contaminants; finally, a chemical vapor deposition to reduce the purified trichlorosilane with hydrogen to produce polysilicon rods which are suitable as feed stock for single crystal growth. The process of purification increases the expense of production by almost two orders of magnitude.

These purification processing costs, though increasing the overall cost of most semiconductor devices, have not effected an intrinsic impediment to the growth and development of that industry. This is principally attributable to the fact that the total area which each transistor or integrated circuit device occupies on a silicon wafer is very small, therein reducing the relative contribution of the silicon itself to the total device fabrication cost.

The solar cell industry, unlike its semiconductor counterpart, does face an inherent price barrier in fabrication costs. At the present cost of about fifteen dollars a peak watt, solar energy has very little viability as an alternative to conventional fossil fuel or even to more exotic nuclear fission produced electricity. As such, solar energy, a clean and pollutant-free source of energy, has been economically limited to remote areas and similarly specialized applications. Technical advances are being made to improve solar cell efficiencies and fabrication processes to result in a net reduction in solar cell costs. However, to achieve a viable cost basis for producing electricity by way of silicon solar cells, a substantial reduction in the material costs is necessary.

To this objective, the present invention provides a method for producing solar grade silicon at a substantial cost reduction over the conventional techniques.

The outer coating of commonly grown rice is comprised primarily of cellulose, lignin and silica. These rice hulls, being indigestible as grown, are a bothersome byproduct of the rice production industry which typically incinerates them at significant expense or simply dumps them into vacant fields. The Quaker Oats Company has developed a commercial application of extracting furfural from the hulls, and Silag, a subsidiary of Exxon Corp, has explored the manufacture of silicon carbide whiskers from rice hulls based on the technology disclosed in U.S. Pat. No. 3,754,076. But generally speaking, these rice by-products have been considered waste materials. The disposal of these hulls has become of significant concern to the rice industry. Many rice producing states have banned or severely restricted rice hull burning because of the toxic by-products produced. Dumping the spent hulls is similarly objectionable due to transporting costs and attendant environmental disfigurement. California alone produces more than two hundred thousand tons of rice hulls a year, and incinerating is not longer permitted there.

One need examine no further the dilemma facing the rice industry to appreciate that rice hulls are a readily abundant, low or no-cost starting material if a beneficial use can be found.

It is therefore the object of the present invention to utilize these rice hulls as a starting material in a unique purification and reduction process to inexpensively produce solar grade silicon, useful in the fabrication of silicon solar cells and similar semiconductor devices.

The purification process, entailing a sequence of leaching and pyrolyzing the rice hulls, provides a high purity feedstock for the subsequent processing into solar grade silicon. This purification produces a feedstock having a significantly reduced overall impurity level and most importantly having a more than one hundred fold reduction in the level of impurities which most detrimentally affect the semiconductor properties of the intended end product.

The reduction process, entailing a sequence of adjusting carbon content and reducing the siliceous material, utilizes the purified feedstock to provide elemental silicon of sufficiently high purity to be used in conventional solar cell processing.

PRIOR ART

The silica content of rice hulls is known in related fields of art. A process which parallels the aforementioned conventional purifying of metallurgical grade silicon has been disclosed by Basu et al, (American Institute of Chemical Engineering Journal, Volume 19, No. 3, May 1973). Basu describes a process by which rice hulls are chlorinated at elevated temperatures to provide silicon tetrachloride which is suggested as useful for the preparation of silicon (as opposed to silicon) intermediates, such as alkyl chlorosilane. It is also of general knowledge in the art that rice hull ash, which constitutes 13–15 percent by weight of the hull content, contains between 95% and 99% $SiO_2$. This silica is typically of greater intrinsic purity than conventional silica sand with respect to inorganic contaminants, although organic contaminants are present in higher quantities.

Due to the high degree of silicon purity required for solar cell and similar semiconductor applications, none of the existing processes have been directed toward producing solar grade silicon from rice hulls.

DESCRIPTION OF THE DRAWINGS

FIG. 1 is a plot of carbon content versus reaction time.

SUMMARY

The present invention relates to the production of high purity solar grade silicon from common rice hulls. A unique process for material purification and reduction, particularly adaptable to the chemical and physical properties of the raw materials used, provides a substantial reduction in the cost of producing solar grade silicon of sufficiently high purity for use in solar cells and similar semiconductor applications. The process comprises leaching the rice hulls in acid followed by treatment with high purity water, coking the acid-cleaned hulls in a non-oxidizing ambient, compensating the carbon or silica content of the coked hulls to obtain a desired carbon to silica ratio and reducing the silica to produce high purity silicon.

The present invention offers numerous advantages including substantial process cost reduction, greater than an order of magnitude; the elimination of certain toxic gases from the processing steps; and the promise of a unitary processing system able to produce solar grade silicon from essentially waste material. The present invention is of particular advantage to the solar cell industry as providing a source of silicon at a cost with which that industry may be enabled to compete with conventional fossil fuel energy sources of energy.

DETAILED DESCRIPTION OF THE INVENTION

The present invention relates to the production of high purity silicon and in particular to the production of solar grade silicon from ordinary rice hulls.

Rice hulls are removed from the grain in the ordinary process of rich threshing. The rice hulls are about 4 to 5 mm. in length, about 1 to 2 mm. in width, and about 0.5 mm. in thickness. The untreated hull contains cellulose, lignin and siliceous material (referred to as ash subsequent to pyrolysis), the latter constituting greater than 95% $SiO_2$. The chaff of the rice stalk contains $SiO_2$ and may accompany the hulls in subsequent processing or be separated by conventional sieve techniques.

In accordance with the invention, the rice hulls which hereinafter may or may not include the chaff, are subjected to a leaching step of bringing the hulls in contact with an acid such as 10-50% concentration of HCl, preferably of semiconductor grade purity. Though HCl has demonstrated the most favorable results, other strong mineral acids such as sulfuric have been shown to be operative in the present invention. The acid leaching is followed by a treatment of the hulls in distilled, deionized water to effect a thorough rinsing. The process of leaching in acid and water reduces overall impurity levels of about 10,000 to 40,000 parts per million (ppm) for unprocessed hulls, to about 400 ppm. Of particular importance is the significant reduction of calcium and magnesium which constitute mobile ions, detrimental to semiconductor performance. Of similar importance is the substantial reduction of manganese and iron which would degrade carrier lifetimes in a semiconductor device.

Repeating the sequence particularly with different batches of acid each time may serve to further reduce the impurity content; however, the added processing has not been deemed of significant advantage. Similarly, acid followed by caustic leaching has not proven substantially advantageous over the aforementioned procedure. The leached hulls are dried by conventional means (i.e. hot flowing air $\approx 110°$ C.) and transferred to a suitable furnace for coking.

The process of coking includes heating the leached rice hulls to a temperature of about 920° C. in a non-oxidizing atmosphere. Such non-oxidizing atmospheres may comprise anhydrous HCl, HBr or HI in an argon or nitrogen carrier. In a preferred embodiment the leached rice hulls are heated to a temperature of about 920° C. in an atmosphere of 1% anhydrous HCl in argon for a period sufficient to coke, e.g. of about one hour. The hulls are pyrolized during the heating, expelling virtually all traceable organic impurities. The coked hulls are physically characterized as black, finely divided, non-agglomerating particulates.

As is presently understood, the final chemical reaction in the process of the present invention is the reduction of silicon dioxide with carbon to form silicon and carbon monoxide. The reaction preferably is of the form:

$$2C + SiO_2 \overset{\Delta}{\rightarrow} 2CO + Si$$

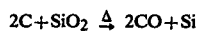

The coking process typically produces higher carbon to silicon ratio than is desired for the final chemical reduction to Si. Therefore, the step of adjusting the ratio of carbon to silicon comprises the alternatives of adding high purity silica to the coked hull composition; or in a preferred embodiment, the controlled combustion of some of the carbon content prior to the final chemical reaction. A partial pressure of a suitable oxidizing agent, 5% $CO_2$ for example, supporting a controlled combustion at about 900° C. is sufficient to adjust the carbon to silica ratio to about 2:1. The step of adjusting the carbon ratio by controlled carbon combusting may be accomplished during or subsequent to the step of coking and by various apparatus as is illustrated in the appendant examples. Alternatively, this combusting may be performed during a preheating of the feedstock hulls in the final chemical reduction to silicon.

It is further believed that the carbon silicon ratio should preferably be adjusted below about 2:1 to compensate for the loss of volatile SiO during the final chemcial reaction. However, the degree of SiO evolution is a function of the design and operation of the final chemical reduction reactor and thereby will be particularly dependent upon the reactor system used. Such deviations to suit reactor needs are clearly within the scope and intent of the present invention.

The aforementioned processes produce a high purity silica feedstock from common rice hulls, which feedstock may be used in the reduction to form solar grade elemental silicon. The process results in a reduction in impurity level of greater than about two orders of magnitude. The metallic or foreign metal impurity level of the coked rice hulls is reduced to less than about 100 ppm by the aforementioned process. More importantly, the impurities of boron and aluminum, which constitues detrimental uncontrolled p-type dopants, are reduced to less than about 10 ppm. The feedstock so produced is of sufficient purity that the elemental silicon produced by the subsequent reduction processes may be used in conventional solar cell and semiconductor processing which processes themselves additionally purify the silicon. Thereby, the elemental silicon produced by the present invention herein referred to as "solar grade" silicon, may be qualitatively defined by its impurity content.

The coked rice hull feedstock, having an appropriately adjusted carbon to silicon ratio, is thermally reduced to silicon and carbon monoxide. The thermal reduction may be accomplished by a number of alternative techniques including induction, arc, plasma arc and fluidized bed furnaces.

Of particular importance to the present invention in the thermal reduction:

$$2C + SiO_2 \rightleftarrows 2CO + Si$$

the carbon monoxide is preferably segregated from extended contact to the silicon product to minimize the production of SiO. Additionally, it is believed that the thermal reduction may undergo a two-step process:

$$C + SiO_2 \rightarrow CO + SiO \qquad (1)$$

$$SiO + C \rightarrow Si + CO \qquad (2)$$

The former step reduces the reaction efficiency of the reduction process since the SiO is volatile at the reduction temperature. Thereby, in a preferred embodiment, means may be provided to minimize the contact of the carbon monoxide with the silicon product.

In one embodiment of the present invention, an extended arc furnace of the type illustrated in U.S. Pat. No. 4,006,284 was utilized in the thermal reduction process. The extended arc plasma supported by an argon gas flow has been demonstrated to satisfactorily reduce the carbon silica composite at a temperature of about 1900° C. Though a temperature of about 1900° C. provided a most favorable silicon yield, lower temperatures down to about 1400° C. have produced the desired chemical reduction at reduced efficiencies.

The molten silicon may be drawn off to solidify into high purity polycrystalline silicon or directed into a conventional crystal growing apparatus to grow single crystal ingots.

To present a better understanding to one skilled in the art, the following examples are illustrative of the present invention.

EXAMPLE 1

Rice hulls were boiled in 500 ml of 1:1 aqueous semiconductor grade HCl for a period of 1 hour, followed by a thorough rinse in distilled deionized water. The hulls were dried in room temperature flowing air and a sample of these hulls along with a sample of the untreated hulls (comparison standard) was subjected to emission spectrographic analysis, performed commercially by Ledoux and Co. of Teaneck, New Jersey. The impurity contents of the raw and initially processed hulls are referenced in Table 1.

The leached hulls were transferred to a quartz boat where the hulls were then pyrolyzed at about 900° C. in a quartz tube furnace for about 30 minutes in flowing argon containing 1% anhydrous HCl. The sample was further analyzed as to carbon and silica content which indicated a carbon to silica ratio of about 4:1.

To adjust the carbon to silica ratio, the coked rice hulls were transferred to a conventional fluidized bed combustor. To maintain a uniform composition of the coked material, a preferred endothermic process utilizing carbon dioxide as an oxidizing agent was employed. The bed is fluidized with high purity argon containing 5% $CO_2$ by volume. Maintaining the bed at about 950° C. a constant reaction rate is maintained throughout the coked hull bed. Referring now to FIG. 1, therein is shown a plot of carbon content versus the reaction time of the aforementioned carbon reduction illustrating the degree of control over the carbon to silica ratio. In this example the reaction was terminated at a time calculated to provide a carbon to silicon ratio just below about 2:1. A sample of the coked hulls was subjected to the aforementioned impurity analysis, the results of which are contained in Table 1. Though not illustrated, the silica content, being inert at room temperatures, was verified as remaining virtually unchanged.

The feedstock of coked rice hulls, having a carbon to silica ratio just below about 2:1, was fed into an extended arc furnace of the type described in U.S. Pat. No. 4,006,284 to thermally reduce the carbon and silica to silicon and carbon monoxide. The feedstock particulate was continuously fed into the extended arc whose walls were maintained at about 1900° C. The high purity molten silica was allowed to cool and crystallize to form polycrystalline silicon.

EXAMPLE 2

The processing steps are essentially the same as in Example 1, except that the reduction of the rice hull feedstock to silica is accomplished in an induction furnace heated to 1900° C.

EXAMPLE 3

The processing steps are essentially the same as in Example 1, except that the rice hull feedstock is agglomerated into larger chunk-like segments. This may be accomplished, for example, by cementing the rice hull feedstock with sugar or molasses, a technique known in the art. The use of such binder material requires a corresponding reduction in feedstock carbon content which is accomplished by extending the time of controlled carbon combustion described heretofore.

The agglomerated feedstock, appearing as chunk-like material, is placed in a submerged arc furnace for the reduction processing. The reduction process is similar to that described in Example 1 except that the arc electrode tips are submerged within the feedstock material. The high purity molten silica is allowed to cool and crystallize to form polycrystalline silicon.

Those specialized in the art of photovoltaic devices realize that innovations in the art suggest the use of polycrystalline silicon in forming solar cell devices. Alternatively, the polycrystalline material serves as feedstock material for the conventional growth of a single crystal boule of silicon. In producing the typical single crystal solar cell, the boule is sawed into thin wafers, the wafers subjected to a series of etching and diffusion processes and electrodes are affixed to the cell, all of which processes are well known in the art.

TABLE I

EMISSION SPECTROGRAPHIC ANALYSES OF RAW AND CLEANED RICE HULLS

| | Impurities | Raw Rice Hulls (La.) | 5X Distilled Water Rinses | Rinses Plus HCl Aqueous Cleaning | Rinses Plus 1:3 HCl:H$_2$O Boiled 1 Hour | Previous Clean Plus 1:1 HCl:H$_2$O Boiled 20 Mins. | Previous Clean Plus 1 Hr. Soak in Distilled Water | 1:3 HCl:H$_2$O Plus 1:1 HCl:H$_2$O Plus SC-2 20 Min. Hot | Duplicate of Previous Sample | 1:1 HCl:H$_2$O Boiled 1 Hr. Plus Coked in 1% HCl in Argon |
|---|---|---|---|---|---|---|---|---|---|---|
| | | Raw Hulls | Water Washed | Acid Cleaned | Acid Cleaned | Double Acid Cleaned | Acid Water Soak | HCl/H$_2$O Cleaned | HCl/H$_2$O$_2$ Cleaned Duplicate | HCl Coked |
| Dopants | B | 10 | 40 | — | 10 | 10 | 10 | 10 | 10 | 5 |
| | Al | 200 | 900 | 100 | 100 | 60 | 50 | 200 | 100 | 10 |
| | N.D. | Present | N.D. | N.D. | N.D. | N.D. | N.D. | N.D. | N.D. | N.D. |
| Lifetime Killers | Cr | N.D. | N.D. | N.D. | N.D. | N.D. | N.D. | 10 | 40 | N.D. |
| | Mn | 1500 | 1600 | 50 | 30 | 30 | 40 | 40 | 30 | 10 |
| | Fe | 900 | 700 | 30 | 50 | 40 | 30 | 40 | 30 | 10 |
| | Cu | 10 | 20 | N.D. | N.D. | N.D. | N.D. | N.D. | N.D. | N.D. |
| | Ni | N.D. | N.D. | N.D. | N.D. | N.D. | N.D. | N.D. | N.D. | N.D. |
| Mobile Ions | Na | 400 | 600 | 70 | 10 | 10 | 10 | 10 | 30 | 10 |
| | K | — | 2000 | — | 30 | 10 | 10 | 20 | 20 | 10 |
| | Li | — | N.D. | — | N.D. | N.D. | N.D. | N.D. | N.D. | N.D. |
| | Mg | 3000 | 2200 | 50 | 60 | 60 | 60 | 60 | 80 | 20 |
| | Ca | 4000 | 6300 | 50 | 70 | 50 | 70 | 60 | 70 | N.D. |
| Miscellaneous | Ti | 20 | 200 | 10 | 60 | 60 | 60 | 70 | 200 | N.D. |
| | Zn | — | N.D. | — | N.D. | N.D. | N.D. | N.D. | N.D. | N.D. |
| | Pb | — | 10 | — | N.D. | N.D. | N.D. | N.D. | N.D. | N.D. |
| | Mo | N.D. | N.D. | N.D. | N.D. | N.D. | N.D. | N.D. | N.D. | N.D. |
| | Pd | N.D. | N.D. | N.D. | N.D. | N.D. | N.D. | N.D. | N.D. | N.D. |
| Total | | 10,040 | 14,620 | 360 | 420 | 330 | 340 | 520 | 580 | 75 |

What is claimed is:

1. A process for producing solar grade high purity silicon from common rice hulls comprising:
    leaching the rice hulls in acid and in water,
    coking the leached rice hulls to produce a composite of carbon and silica,
    adjusting the carbon to silica ratio of the coked rice hulls to less than about 2:1,
    thermally reducing the adjusted carbon and silica mixture to produce elemental silicon.

2. The process set forth in claim 1 wherein the step of leaching comprises contacting said rice hulls with aqueous hydrochloric acid and rinsing in distilled water.

3. The process set forth in claim 2 wherein said leaching reduces the impurity level in the rice hulls to below about 400 ppm.

4. The process set forth in claim 2 wherein said leaching reduces the impurity level of calcium and magnesium to below about 50 ppm and reduces the impurity level of maganese and iron to below about 30 ppm.

5. The process set forth in claim 1 wherein the size of the rice hulls is decreased by grinding or milling.

6. The process set forth in claim 1 wherein said coking comprises pyrolyzing the rice hulls at a temperature of about 920° C. in a non-oxidizing atmosphere comprising a gaseous mixture of an inert gas and at least one of the group of anhydrous acids consisting of HCl, HBR, and HI.

7. The process set forth in claim 6 wherein the gaseous mixture comprises about 1% anhydrous hydrogen chloride.

8. The process set forth in claims 6 or 7 wherein said inert gas comprises argon or nitrogen.

9. The process set forth in claim 6 or claim 7 wherein said steps of leaching and coking reduces the impurity level of the rice hulls to about 100 ppm.

10. The process set forth in claim 1 or claim 8 wherein said steps of leaching and coking reduces the boron impurity level to about 5 ppm.

11. The process set forth in claim 1 or claim 8 wherein said steps of leaching and coking reduces the aluminum impurity level to below about 10 ppm.

12. The process set forth in claim 1 wherein the step of adjusting the carbon to silica ratio comprises adding high purity silica to the coked rice hulls.

13. The process set forth in claim 12 wherein the added silica comprises finely divided uniformly dispersed quartz.

14. The process set forth in claim 1 wherein the step of adjusting the carbon to silica ratio comprises the controlled partial combustion of the carbon content of the carbon and silica composite.

15. The process set forth in claim 14 wherein the controlled partial combustion is accomplished in the presence of a gaseous mixture of argon and carbon dioxide.

16. The process set forth in claim 15 wherein the gaseous mixture contains about 5% carbon dioxide.

17. The process set forth in claim 16 wherein the temperature of the controlled partial combustion is about 950° C.

18. The process set forth in claim 15 wherein the partial combustion of carbon produces a carbon to silica ratio controllably variable between 2.5:1 to 1.4:1.

19. The process set forth in claim 1 wherein the step of reducing the coked rice hulls comprises thermally reacting the carbon and silica in an arc furnace at a temperature of about 1900°.

20. A process for producing a silicon single crystal solar cell comprising:
    (a) leaching rice hulls in acid and water;
    (b) coking the leached rice hulls in a non-oxidizing atmosphere;

(c) adjusting the carbon to silica content ratio to below about 2.5 to 1;
(d) reducing the adjusted rice hulls at a temperature of about 1900° C. to form silicon and carbon monoxide;
(e) growing a single crystal boule from said silicon;
(f) sawing said single crystal boule into thin wafers;
(g) providing a suitable junction in or on said wafers;
(h) providing ohmic contacts to either side of said junction to form a solar cell.

21. A process for producing a high purity feedstock of carbon and silica from common rice hulls which feedstock is capable of being reduced to high purity elemental silicon, said process comprising the steps of leaching the rice hulls in acid and in water then coking the leached rice hulls to provide a composite of carbon and silica.

22. The process set forth in claim 21 wherein the step of leaching the rice hulls comprises contacting the hulls with aqueous hydrochloric acid and rinsing in distilled water.

23. The process set forth in claim 21 wherein said leaching reduces the impurity level of the rice hulls to below about 400 ppm.

24. The process set forth in claim 21 wherein said leaching reduces the impurity level of calcium and magnesium to below about 50 ppm and reduces the impurity level of manganese and iron below about 30 ppm.

25. The process set forth in claim 21 wherein said coking comprises pyrolyzing the rice hulls at a temperature of about 920° C. in a non-oxidizing atmosphere comprising a gaseous mixture of an inert gas and at least one of the group of anhydrous acids consisting of HCl, HBR, and HI.

26. The process set forth in claim 25 wherein the gaseous mixture comprises about 1% anhydrous hydrochloric acid.

27. The process set forth in claims 25 or 26, wherein said inert gas comprises argon or nitrogen.

28. The process set forth in claim 25 or claim 26 wherein said steps of leaching and coking reduces the impurity level of the rice hulls to about 100 ppm.

29. The process set forth in claim 21 or claim 27 where said steps of leaching and coking reduces the boron impurity level to below about 5 ppm.

30. The process set forth in claim 21 or claim 27 wherein said steps of leaching and coking reduces the aluminum impurity level to below about 10 ppm.

31. A process for producing a carbon and silica feedstock from common rice hulls capable of being reduced to high purity elemental silicon comprising steps of:
leaching the rice hulls in acid solution containing from 10% to 50% by volume HCl followed by rinsing the hulls in distilled deionized water, coking the leached rice hulls at a temperature of about 920° C. in an atmosphere of argon containing 1% anhydrous HCl to produce a composite of carbon and silica having an impurity content less than about 100 ppm.

* * * * *